(12) United States Patent
Muguda

(10) Patent No.: US 9,665,410 B2
(45) Date of Patent: May 30, 2017

(54) PROCESSING OF APPLICATION PROGRAMMING INTERFACE TRAFFIC

(71) Applicant: Google Inc., Mountain View, CA (US)

(72) Inventor: Naveenkumar Muguda, Karnataka (IN)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/794,839

(22) Filed: Mar. 12, 2013

(65) Prior Publication Data
US 2014/0282626 A1    Sep. 18, 2014

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/54 | (2006.01) | |
| H04L 12/911 | (2013.01) | |
| H04L 12/927 | (2013.01) | |
| H04L 29/08 | (2006.01) | |

(52) U.S. Cl.
CPC .............. *G06F 9/54* (2013.01); *H04L 47/781* (2013.01); *H04L 47/805* (2013.01); *H04L 47/823* (2013.01); *H04L 67/2842* (2013.01); *H04L 67/322* (2013.01)

(58) Field of Classification Search
None
See application file for complete search history.

(56) References Cited

U.S. PATENT DOCUMENTS

| | | | |
|---|---|---|---|
| 5,666,655 A * | 9/1997 | Ishikawa et al. | 455/512 |
| 7,069,375 B2 * | 6/2006 | Avida et al. | 710/316 |
| 8,443,348 B2 * | 5/2013 | McGuire et al. | 717/146 |
| 8,457,036 B2 * | 6/2013 | Goldshtein et al. | 370/316 |
| 2004/0185842 A1 * | 9/2004 | Spaur et al. | 455/420 |
| 2006/0075079 A1 * | 4/2006 | Powers et al. | 709/220 |
| 2012/0278388 A1 * | 11/2012 | Kleinbart et al. | 709/204 |
| 2013/0138886 A1 * | 5/2013 | Yamauchi et al. | 711/120 |
| 2013/0212603 A1 * | 8/2013 | Cooke et al. | 719/328 |

* cited by examiner

*Primary Examiner* — Tuan Dao
*Assistant Examiner* — William C Wood
(74) *Attorney, Agent, or Firm* — Fish & Richardson P.C.

(57) ABSTRACT

A method and system for processing application programming interface (API) traffic includes determining corresponding API traffic at a time interval, assigning a corresponding priority value and allocating a cache memory to store a data set that corresponds to a high priority value. The method also includes receiving a plurality of sets of API requests, comparing corresponding precedence value associated with the sets of API requests, determining a set of API requests and allocating bandwidth to the set of API requests. The method further includes receiving a first set of API requests, determining a total number of processed API requests and predicting a second constant number API requests that is included in a second set of API requests. The system includes an electronic device, a communication interface, a memory and a processor.

29 Claims, 15 Drawing Sheets

PROCESSING OF APPLICATION PROGRAMMING INTERFACE TRAFFIC

TECHNICAL FIELD

Embodiments of the disclosure relate to the field of processing application programming interface (API) traffic, and more specifically in the field of providing caching and enabling equitable bandwidth distribution of the API traffic.

BACKGROUND

In recent times, mobile applications have increased in popularity, thereby enabling speedy browsing and storage of large amount of data. Examples of the data include, but are not limited to, videos, catalogues, maps and music. The mobile applications also enable advertising of various products. The mobile applications are created using an Application Programming Interface (API). The API is a web platform including various components that enable creation of the mobile applications.

An API provider receives API traffic including large number of API requests, which correspond to the mobile applications, from multiple API developers. Each API developer is assigned a data channel for transmitting the API requests. The API requests from various data channels are received, by the API provider, in a multiplexed communication channel. The API provider further processes each of the API requests.

A conventional method of processing the API requests includes caching data sets based on a frequency of accessing a data set by the API requests. Purging of the data sets from a cache memory is also based on a time to live (TTL) associated with a data set that is stored in the cache memory. The caching of the data sets is also performed based on a service level agreement (SLA) associated with each API developer. The caching enables improved response time for the API requests. However, the conventional method of caching does not efficiently utilize the cache memory for storing the data set. The processing of the API requests also includes providing bandwidth for processing the API requests. The bandwidth for processing the API requests is provided, to each API developer, based on the SLA. In one example, the SLA can include providing the bandwidth for processing a pre-defined number of the API requests for a specific time duration. The processing is ceased when the API requests exceeds the pre-defined number. However, the conventional method fails to provide equitable distribution of the bandwidth for processing the API requests, which corresponds to each API developer, included in the API traffic. Further, the conventional method also results in under utilization of processing capacity of a message processing unit that is used for processing the API requests included in the API traffic.

In the light of the foregoing discussion, there is a need for processing the API traffic to enable equitable distribution of the bandwidth, enhanced user experience and increased revenue to the API provider.

SUMMARY

The above-mentioned needs are met by a method, a computer program product and a system for processing application programming interface traffic.

An example of a method of processing application programming interface (API) traffic includes determining corresponding API traffic present in each data channel at a time interval. The corresponding API traffic is enabled to access one or more data sets. Each data channel of a plurality of data channel is associated to an API developer of the plurality of API developers. The method also includes assigning a corresponding priority value to each of the one or more data sets based on the corresponding API traffic present in each data channel for the time interval. The corresponding priority value is assigned to determine a data set, of the plurality of data sets, that corresponds to a high priority value. The method further includes allocating a cache memory to store the data set that corresponds to the high priority value.

An example of a method of processing application programming interface (API) traffic includes receiving a plurality of sets of API requests from a plurality of API developers. Each of the plurality of sets of API requests is being associated with a corresponding precedence value that is based on a plurality of factors. The method also includes comparing corresponding precedence values, associated with the plurality of sets of API requests, with each other to determine the corresponding precedence value of high priority. The method further includes determining a set of API requests, from the plurality of sets of API requests based on the corresponding precedence value, of a high priority. Further, the method includes allocating bandwidth to the set of API requests to enable processing of the set of API requests.

An example of a method of processing application programming interface (API) traffic, obtained from a plurality of API developers, for enhanced user experience and increased revenue includes receiving a first set of API requests by a message processing unit. The first set of API requests including a first constant number of the API requests. The method also includes determining a total number of processed API requests comprised in the first set of API requests. The method further includes predicting a second constant number of API requests based on the total number of processed API requests. The second constant number is included in a second set of API requests.

An example of a computer program product stored on a non-transitory computer-readable medium that when executed by a processor, performs a method of processing application programming interface (API) traffic includes determining corresponding application programming interface (API) traffic present in each data channel at a time interval. The corresponding API traffic is enabled to access one or more data sets. Each data channel of a plurality of data channel is associated to an API developer of the plurality of API developers. The computer program product also includes assigning a corresponding priority value to each of the one or more data sets based on the corresponding API traffic present in each data channel for the time interval. The corresponding priority value is assigned to determine a data set, of the plurality of data sets, that corresponds to a high priority value. The computer program product further includes allocating a cache memory to store the data set that corresponds to the high priority value.

An example of a computer program product stored on a non-transitory computer-readable medium that when executed by a processor, performs a method of processing application programming interface (API) traffic includes receiving a plurality of sets of API requests from a plurality of API developers. Each of the plurality of sets of API requests is being associated with a corresponding precedence value that is based on a plurality of factors. The computer program product also includes comparing corresponding precedence values, associated with the plurality of sets of API requests, with each other to determine the corresponding precedence value of high priority. The computer program product further includes determining a set of API requests, from the plurality of sets of API requests based on the corresponding precedence value, of a high priority. Further, the computer program product includes allocating bandwidth to the set of API requests to enable processing of the set of API requests.

An example of a computer program product stored on a non-transitory computer-readable medium that when executed by a processor, performs a method of processing application programming interface traffic (API) includes receiving a first set of API requests by a message processing unit. The first set of API requests including a first constant number of the API requests. The computer program product also includes determining a total number of processed API requests comp in the first set of API requests. The computer program product further includes predicting a second constant number of API requests based on the total number of processed API requests. The second constant number is included in a second set of API requests.

An example of a system for processing application programming interface traffic (API) includes an electronic device. The system also includes a communication interface in electronic communication with the electronic device. The system further includes a memory that stores instructions. Further, the system includes a processor responsive to the instructions to determine corresponding API traffic present in each data channel at a time interval. The corresponding API traffic is enabled to access one or more data sets. Each data channel of a plurality of data channel is associated to an API developer of the plurality of API developers. The processor is also responsive to the instructions to assign a corresponding priority value to each of the one or more data sets based on the corresponding API traffic present in each data channel for the time interval. The corresponding priority value is assigned to determine a data set, of the plurality of data sets, that corresponds to a high priority value. Further, the processor is responsive to the instructions to allocate a cache memory to store the data set that corresponds to the high priority value.

BRIEF DESCRIPTION OF THE FIGURES

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method, computer program product and system for processing application programming interface (API) traffic. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
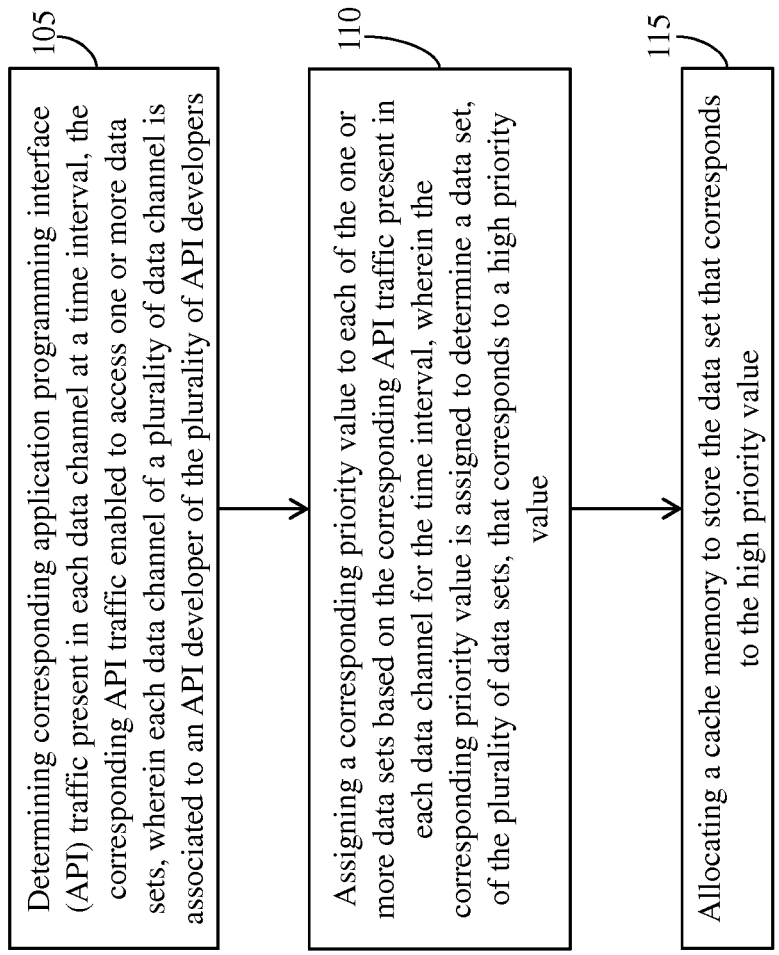
FIG. 1 is a flow diagram illustrating a method of processing application programming interface (API) traffic in accordance with one embodiment.

FIG. 1 is a flow diagram illustrating a method of processing application programming interface (API) traffic in accordance with one embodiment.

At step 105, corresponding API traffic, at a time interval, present in each data channel, of the multiple data channels, is determined. The corresponding API traffic from each API developer includes multiple API requests. Each data channel is enabled access to one or more data sets. An API environment includes multiple data sets. The data sets include data that enables processing of the API requests. Each data channel corresponds to one API developer, of multiple API developers, present in the API environment. Hence, every API developer is allocated one data channel for accommodating the corresponding API traffic.

The corresponding API traffic present in each data channel, for the time interval, is determined based on one or more prediction algorithms. In one example, the prediction algorithms can include a regression algorithm. The prediction algorithms utilize historic data to determine the corresponding API traffic present in each data channel at various time intervals.

At step 110, a corresponding priority value is assigned to each data set. The corresponding priority value is assigned based on the corresponding API traffic present in each data channel at the time interval. Hence, the corresponding priority value to each data set varies at different time intervals since the corresponding API traffic present in each data channel varies at different time intervals.

In some embodiments, the corresponding priority value, to each data set, is assigned based on a channel priority associated with each data channel and the corresponding API traffic present in each data channel. A product of the channel priority of each data channel and the corresponding API traffic present in each data channel is calculated. The product obtained for each data channel is compared with each other. The corresponding priority value is assigned based on the product. The channel priority of each data channel is assigned based on a service level agreement (SLA) associated with each API developer corresponding to the data channel.

Each data set is assigned a priority value such that a data set, of the multiple data sets, with a high priority value is determined. The data set with the high priority value, for the time interval, is determined when the corresponding API traffic of large intensity is accessing the data set at the time interval.

If two or more data sets are associated with the corresponding priority value that are equal to each other, then the high priority value is assigned to a data set based on a total number of data channels accessing each of the data sets and an API traffic intensity associated with each of the data sets. The API traffic intensity can be defined as a total number of API requests, present in each data channel, requiring access to the data set.

If two or more data channels, of the multiple data channels, include the channel priority and the API traffic intensity that are equivalent to each other, at a given time interval, then the high priority value, to a data set, is assigned based on the given time interval during which the data set is predicted to be associated with the corresponding API traffic of large intensity.

In another embodiment, the corresponding priority value, to each data set, is assigned based on a pre-defined API traffic threshold. If the corresponding API traffic, present in a data channel, crosses the pre-defined API traffic threshold then the data set that is accessed by the data channel crossing the pre-defined API traffic threshold is assigned the corresponding priority value. The data set that is accessed by the data channel crossing the pre-defined API traffic threshold is assigned the corresponding priority value to ensure presence of sufficient API traffic prior to allocating a cache memory to the data set.

At step 115, the cache memory is allocated to store the data set, for the time interval, that corresponds to the high priority value. Hence, the data set can be accessed, for the time interval, by the corresponding API traffic present in the data channel. One or more caching techniques, for example simplex method, quadratic programming, constraint satisfaction programming and linear programming are used for the allocation of the cache memory.

By assigning the priority values based on the time interval, the data sets that are accessed extensively during a particular time interval is allocated the cache memory for that time interval, hence, providing enhanced user experience to an API developer and increased revenue to an API provider.

Figure 2:
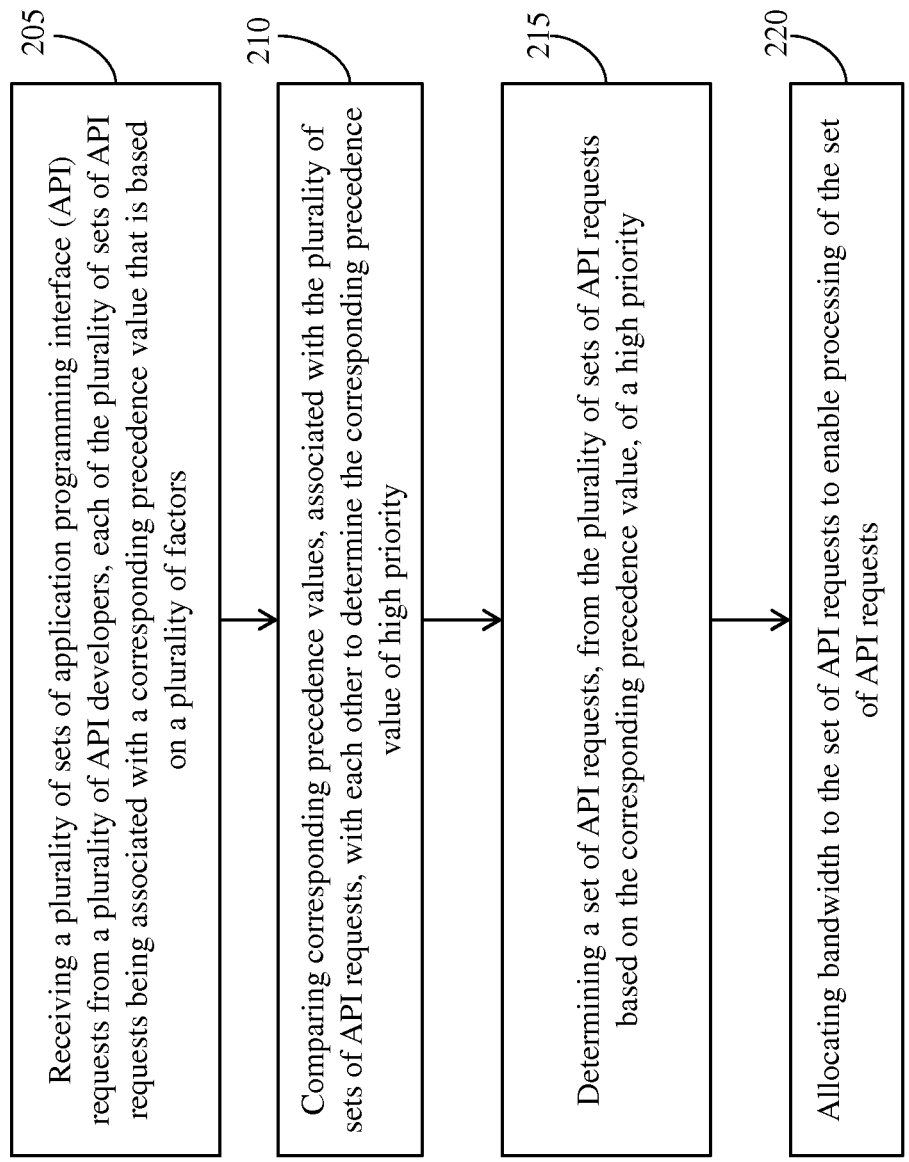
FIG. 2 is a flow diagram illustrating a method of processing application programming interface (API) traffic in accordance with another embodiment.

FIG. 2 is a flow diagram illustrating a method of processing application programming interface (API) traffic in accordance with another embodiment.

At step 205, multiple sets of API requests are received from multiple API developers. Each set of API requests corresponds to each API developer. Also, each set of API requests is associated with a corresponding precedence value.

The corresponding precedence value, to each set of API requests, is provided based on multiple factors. The multiple factors include a business associated with each API developer and a maximum processing capacity of a message processing unit that processes the multiple sets of API requests.

At step 210, the corresponding precedence value associated with each set of API requests are compared with each other.

At step 215, a set of API requests, of the multiple sets of API requests, is determined. The set of API requests is associated with the corresponding precedence value of a high priority. The high priority refers the corresponding precedence value with a high numerical value or the high priority is provided, to the set of API requests, based on the multiple factors when two or more sets of API requests are associated with the corresponding precedence value that are equivalent to each other.

At step 220, bandwidth is allocated to the set of API requests to enable processing of the set of API requests. The processing of the set of API requests enables an API developer transmitting the set of API requests to utilize an API for executing an application on one or more electronic devices.

By allocating the bandwidth based on the corresponding precedence value of high priority, equitable distribution of the bandwidth is achieved. Further, allocation of the bandwidth based on the precedence value enables processing of multiple API requests from same API developer with different precedence values. Further, allocation of the bandwidth based on the precedence value enable an API developer to continue to consume the bandwidth despite exceeding pre-defined number of API requests.

Figure 3:
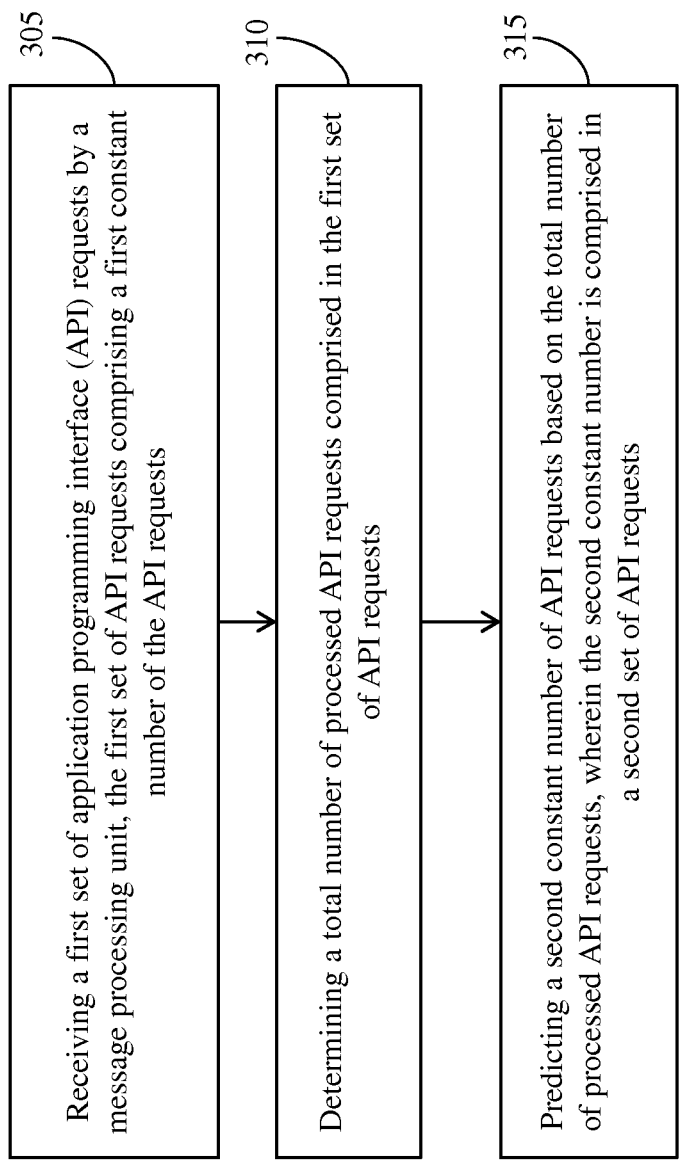
FIG. 3 is a flow diagram illustrating a method of processing application programming interface (API) traffic in accordance with yet another embodiment.

FIG. 3 is a flow diagram illustrating a method of processing application programming interface (API) traffic in accordance with yet another embodiment.

At step 305, a first set of API requests is received by a message processing unit, for example the message processing unit 400. The first set of API requests can be transmitted by an API developer to the message processing unit. The first set of API requests includes a first constant number of the API requests. In one example, the first set of API requests can include the first constant number of 1000 API requests. The first set of API requests including the first constant number of 1000 API requests is transmitted by the API developer to the message processing unit. Further, the message processing unit receives the first set of API requests.

At step 310, a total number of processed API requests included in the first set of API requests are determined. The total number of processed API requests is a subset of the first set of API requests that are processed by the message processing unit. Hence, a specific number of unprocessed API requests that is also a subset of the first set of API requests is present. In one example, the total number of processed API requests, included in the first set of API requests including 1000 API requests, can include 990 API requests. Hence, the total number of processed API requests is equivalent to 990 API requests.

At step 315, a second constant number of API requests are predicted based on the total number of processed API requests. The second constant number of API requests is included in a second set of API requests. Prediction of the second constant number of API requests includes either increasing the first constant number of the API requests or decreasing the first constant number of the API requests based on total number of processed API requests. The second constant number of API requests are predicted to ensure the first set of API requests are processed completely such that the total number unprocessed API requests are eliminated.

In one example, the second constant number of API requests is predicted to be equivalent to 990 API requests based on the total number of processed API requests that is equivalent to 990 API requests. The prediction of the second constant number of API requests that is equivalent to 990 API requests includes decreasing of the first constant number of 1000 API requests. The first constant number of 1000 API requests is decreased by 10 API requests based on the total number of processed API requests that is equivalent to 990 API requests. In another example, if the first set of API requests including 1000 API requests are processed completely, then the total number of processed API requests is equivalent to 1000 API requests. In such cases, the prediction of the second constant number of the API requests includes increasing of the first constant number of 1000 API requests by a pre-defined number.

Further, the second set of API requests including the second constant number of API requests are received by the message processing unit for processing. The second set of API requests includes the second constant number of API requests that are obtained based on the total number of processed API requests included in the first set of API requests. Hence, the second set of API requests are processed completely, thereby eliminating unprocessed API requests in the second set of API requests.

For example, the second set of API requests including the second constant number of API requests that is equivalent to 990 API requests is transmitted to the message processing unit for processing. The second constant number of API requests that is equivalent to 990 API requests is obtained based on the total number of processed API requests that is equal to 990 API requests. Hence, the second set of API requests including 990 API requests is processed completely.

Further, upon processing the second set of API requests completely, steps from 305 through 315, is performed iteratively at regular time intervals. The steps from 305 through 315 can be referred to as first iteration. Second iteration of the steps 305 through 315 begins upon completion of the first iteration. In the second iteration of the steps from 305 through 315, the second set of API requests is considered to be the first set of API requests.

The prediction of the second constant number of the API requests based on the total number of processed API requests thereby ensures elimination of unprocessed API requests.

Figure 4:
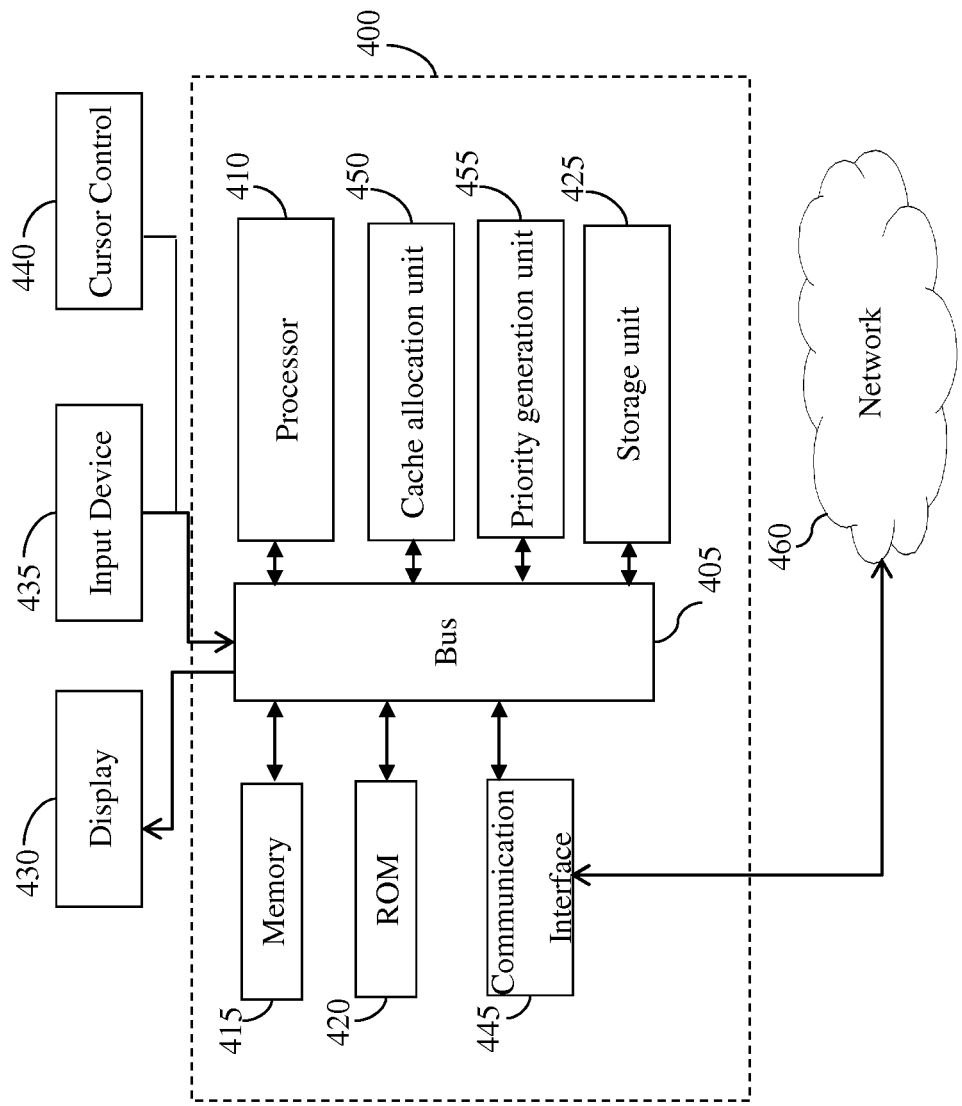
FIG. 4 is a block diagram of a message processing unit, in accordance with one embodiment.

FIG. 4 is a block diagram of a message processing unit 400, in accordance with one embodiment.

The message processing unit 400 includes a bus 405 or other communication mechanism for communicating information, and a processor 410 coupled with the bus 405 for processing information. The message processing unit 400 also includes a memory 415, for example a random access memory (RAM) or other dynamic storage device, coupled to the bus 405 for storing information and instructions to be executed by the processor 410. The memory 415 can be used for storing temporary variables or other intermediate information during execution of instructions by the processor 410. The message processing unit 400 further includes a read only memory (ROM) 420 or other static storage device coupled to the bus 405 for storing static information and instructions for the processor 410. A storage unit 425, for example a magnetic disk or optical disk, is provided and coupled to the bus 405 for storing information, for example a list of multiple API developers, application programming interface (API) traffic intensity associated with each of the API developers and a corresponding API traffic associated with each of the API developers at a plurality of time intervals.

The message processing unit 400 can be coupled via the bus 405 to a display 430, for example a cathode ray tube (CRT), for displaying data. The input device 435, including alphanumeric and other keys, is coupled to the bus 405 for communicating information and command selections to the processor 410. Another type of user input device is the cursor control 440, for example a mouse, a trackball, or cursor direction keys for communicating direction information and command selections to the processor 410 and for controlling cursor movement on the display 430.

Various embodiments are related to the use of the message processing unit 400 for implementing the techniques described herein. In some embodiments, the techniques are performed by the message processing unit 400 in response to the processor 410 executing instructions included in the memory 415. Such instructions can be read into the memory 415 from another machine-readable medium, for example the storage unit 425. Execution of the instructions included in the memory 415 causes the processor 410 to perform the process steps described herein.

In some embodiments, the processor 410 can include one or more processing units for performing one or more functions of the processor 410. The processing units are hardware circuitry used in place of or in combination with software instructions to perform specified functions.

The term "machine-readable medium" as used herein refers to any medium that participates in providing data that causes a machine to perform a specific function. In an embodiment implemented using the message processing unit 400, various machine-readable media are involved, for example, in providing instructions to the processor 410 for execution. The machine-readable medium can be a storage medium, either volatile or non-volatile. A volatile medium includes, for example, dynamic memory, for example the memory 415. A non-volatile medium includes, for example, optical or magnetic disks, for example the storage unit 425. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 405. Transmission media can also take the form of acoustic or light waves, such as those generated during radio-wave and infra-red data communications. Examples of machine-readable media may include, but are not limited to, a carrier wave as described hereinafter or any other media from which the message processing unit 400 can read. For example, the instructions can initially be carried on a magnetic disk of a remote computer. The remote computer can load the instructions into its dynamic memory and send the instructions over a telephone line using a modem. A modem local to the message processing unit 400 can receive the data on the telephone line and use an infra-red transmitter to convert the data to an infra-red signal. An infra-red detector can receive the data carried in the infra-red signal and appropriate circuitry can place the data on the bus 405. The bus 405 carries the data to the memory 415, from which the processor 410 retrieves and executes the instructions. The instructions received by the memory 415 can optionally be stored on the storage unit 425 either before or after execution by the processor 410. All such media must be tangible to enable the instructions carried by the media to be detected by a physical mechanism that reads the instructions into a machine.

The message processing unit 400 also includes a communication interface 445 coupled to the bus 405. The communication interface 445 provides a two-way data communication coupling to the network 460. For example, the communication interface 445 can be an integrated services digital network (ISDN) card or a modem to provide a data communication connection to a corresponding type of telephone line. As another example, the communication interface 445 can be a local area network (LAN) card to provide a data communication connection to a compatible LAN. In any such implementation, the communication interface 445 sends and receives electrical, electromagnetic or optical signals that carry digital data streams representing various types of information.

The message processing unit 400 further includes a cache allocation unit 450 that enables allocation of a cache memory to the corresponding API traffic associated with each of the API developers. The message processing unit 400 also includes a priority generation unit 455 that enables assignment of a plurality of priority values to a plurality of data sets.

The processor 410 in the message processing unit 400 is configured to determine a corresponding API traffic, at a time interval, present in each data channel, of the multiple data channels. The message processing unit 400 assigns each data channel to one API developer, of multiple API developers, present in an API environment. The message processing unit 400 employs one or more prediction algorithms that use historic data to determine the corresponding API traffic present in each data channel at various time intervals.

The processor 410, upon determining the corresponding API traffic, assigns a corresponding priority value to each data set. The processor 410 assigns the corresponding priority value based on the corresponding API traffic present in each data channel at the time interval. Further, the processor 410 is configured to alter the corresponding priority value as the corresponding API traffic present in each data channel varies at different time intervals.

In one embodiment, the processor 410 is configured to assign the corresponding priority value based on a channel priority associated with each data channel and the corresponding API traffic present in each data channel. The processor 410 is operable to calculate a product of the channel priority associated with each data channel and the corresponding API traffic present in each data channel. The processor 410 is also operable to compare the product obtained for each data channel with each other and further assign the corresponding priority value based on the product obtained.

Further, the processor 410 is operable to determine a data set, of the multiple data sets, with a high priority value. The processor 410 determines the data set of the high priority value, for the time interval, when the corresponding API traffic of large intensity is accessing the data set at the time interval.

If two or more data sets are associated with the corresponding priority value that are equivalent to each other then the processor 410 assigns the high priority value based on the total number of data channels accessing each of the data sets and an API traffic intensity associated with each of the data sets.

If two or more data channels include the channel priority and the API traffic intensity that are equivalent to each other at a given time interval then the processor 410 assigns the high priority value based on the given time interval during which the data set is predicted to be associated with the corresponding API traffic of large intensity.

In another embodiment, the processor 410 assigns the corresponding priority value, to each data set, based on a pre-defined API traffic threshold. If the corresponding API traffic, present in a data channel, crosses the pre-defined API traffic threshold then the processor 410 assigns the corresponding priority value to the data set that is accessed by the data channel crossing the pre-defined API traffic threshold.

Further, the processor 410 is operable to allocate the cache memory to store the data set, for the time interval, which corresponds to the high priority value. Hence, the data set can be accessed, for the time interval, by the corresponding API traffic present in the data channel. The processor 410 employs one or more caching techniques such as simplex method, quadratic programming, constraint satisfaction programming and linear programming for allocation of the cache memory.

The processor 410 is also configured to receive multiple sets of API requests from multiple API developers. Each set of API requests corresponds to each API developer. Also, each set of API requests is associated with a corresponding precedence value.

Also, the processor 410 is operable to compare the corresponding precedence value associated with each set of API requests with each other.

The processor 410 is also operable to determine a set of API requests, of the multiple sets of API requests that is associated with the corresponding precedence value of high priority.

Further, the processor 410 is configured to allocate bandwidth to the set of API requests to enable processing of the set of API requests.

The processor 410 is configured to receive a first set of API requests. The first set of API requests includes a first constant number of the API requests.

The processor 410 is also configured to determine a total number of processed API requests included in the first set of API requests.

Further, the processor 410 is operable to predict a second constant number of API requests based on the total number of processed API requests. Prediction of the second constant number of API requests includes either increasing the first constant number of the API requests or decreasing the first constant number of the API requests, by the processor 410, based on total number of processed API requests.

Further, the processor 410 is configured to receive a second set of API requests including the second constant number of API requests. The second set of API requests are received to ensure processing of the API requests included in the second set completely, thereby eliminating unprocessed API requests.

By assigning the priority values based on the time interval, the data sets that are accessed extensively during a particular time interval is allocated the cache memory for that time interval. Further, by allocating the bandwidth based on the corresponding precedence value of the high priority, equitable distribution of the bandwidth is achieved. Prediction of the second constant number of the API requests based on the total number of processed API requests ensures elimination of unprocessed API requests.

FIGS. 5A-5G are exemplary illustrations of allocating a cache memory during processing of application programming interface (API) traffic.

Figure 5A:
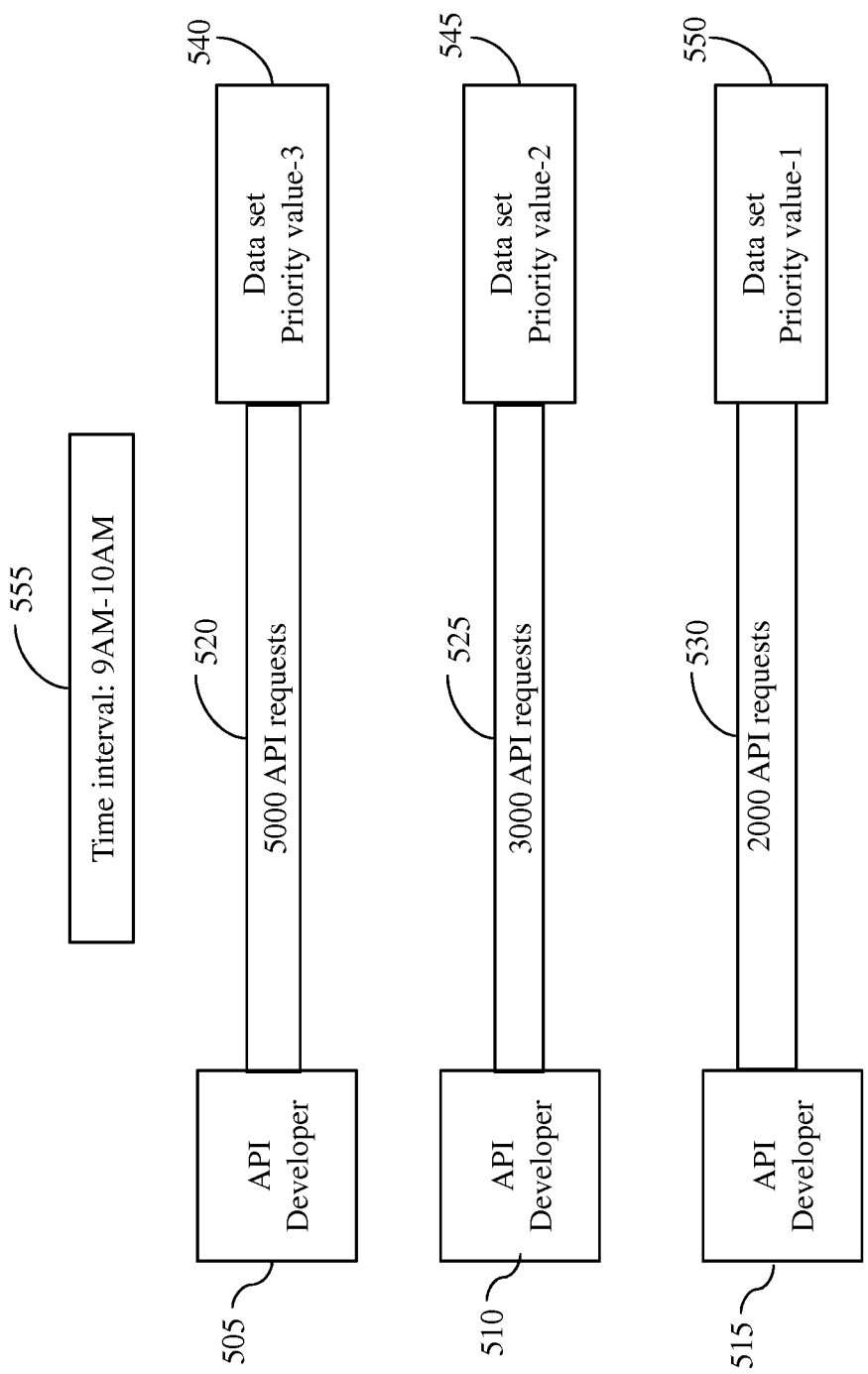
FIGS. 5A-5G are exemplary illustrations of allocating a cache memory during processing of application programming interface (API) traffic.

FIG. 5A includes multiple API developers, for example, an API developer 505, an API developer 510 and an API developer 515. Each of the API developers is associated with corresponding API traffic. The corresponding API traffic associated with the API developer 505 is present in a data channel 520. The corresponding API traffic associated with the API developer 510 is present in a data channel 525. The corresponding API traffic associated with the API developer 515 is present in a data channel 530.

The corresponding API traffic associated with the API developer 505 is enabled to access a data set 540. Also, the corresponding API traffic associated with API developer 510 is enabled to access a data set 545. Further, the corresponding API traffic associated with API developer 515 is enabled to access a data set 550.

The corresponding API traffic associated with the API developer 505, at a time interval 555, enabled to access the data set 540 is determined to be 5000 API requests. Similarly, the corresponding API traffic associated with the API developer 510, at the time interval 555, enabled to access the data set 545 is determined to be 3000 API requests. Likewise, the corresponding API traffic associated with the API developer 515, at the time interval 555, enabled to access the data set 550 is determined to be 2000 API requests. The corresponding API traffic associated with each of the API developers is determined using various prediction algorithms.

A priority value-3 is assigned to the data set 540 since the corresponding API traffic including 5000 API requests, associated with the API developer 505, at the time interval 555, has an API traffic intensity of higher value when compared to the corresponding API traffic associated with the API developer 510 and the corresponding API traffic associated with the API developer 515, at the time interval 555.

A priority value-2 is assigned to the data set 545 since the corresponding API traffic including 3000 API requests, associated with the API developer 510, at the time interval 555, has the API traffic intensity of the higher value when compared to the corresponding API traffic associated with the API developer 515, at the time interval 555.

A priority value-1 is assigned to the data set 550 since the corresponding API traffic including 2000 API requests, associated with the API developer 515, at the time interval 555, has the API traffic intensity of least value when compared to the corresponding API traffic associated with the API developer 505 and the corresponding API traffic associated with the API developer 510, at the time interval 555.

Priority values are assigned to each data sets such that a data set of a high priority is determined. Since the data set 540 holding the priority value-3 is high when compared to the data set 545 with the priority value-2 and the data set 550 with the priority value-1, the data set 540 is determined to possess the high priority.

Further, the cache memory is allocated to the data set 540 for the time interval 555 since the data set 540 possess the high priority. Hence, the 5000 API requests associated with the API developer 505 are processed until lapse of the time interval 555.

Figure 5B:
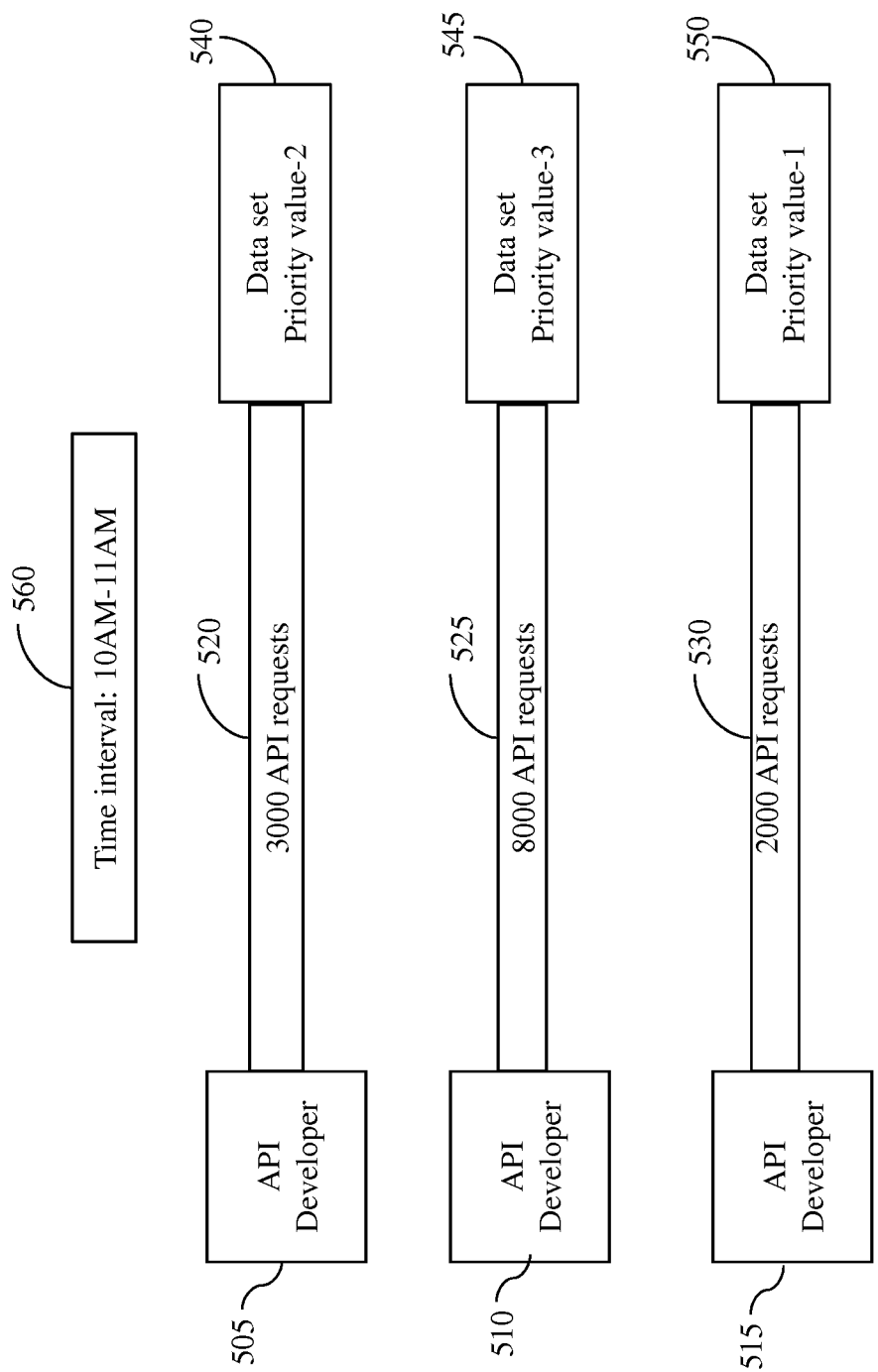

In FIG. 5B the corresponding API traffic associated with the API developer 505, at a time interval 560, enabled to access the data set 540 is determined to be 3000 API requests. Similarly, the corresponding API traffic associated with the API developer 510, at the time interval 560, enabled to access the data set 545 is determined to be 8000 API requests. Likewise, the corresponding API traffic associated with the API developer 515, at the time interval 560, enabled to access the data set 550 is determined to be 2000 API requests.

As a result of change in number of API requests included in the corresponding API traffic associated with each of the API developers, the priority values to each data set is also varied. A priority value-3 is assigned to the data set 545 since the corresponding API traffic including 8000 API requests, associated with the API developer 510, at the time interval 560, has the API traffic intensity of higher value when compared to the corresponding API traffic associated with the API developer 505 and the corresponding API traffic associated with the API developer 515, at the time interval 560.

Further, a priority value-2 is assigned to the data set 540 since the corresponding API traffic including 3000 API requests, associated with the API developer 505, at the time interval 560, has the API traffic intensity of the higher value when compared to the corresponding API traffic associated with the API developer 515, at the time interval 560.

A priority value-1 is assigned to the data set 550 since the corresponding API traffic including 2000 API requests, associated with the API developer 515, at the time interval 560, has the API traffic intensity of least value when compared to the corresponding API traffic associated with the API developer 505 and the corresponding API traffic associated with the API developer 510, at the time interval 560.

Since the data set 545 holding the priority value-3 is high when compared to the data set 540 with the priority value-2 and the data set 550 with the priority value-1, the data set 545 is determined to possess the high priority.

Further, the cache memory is allocated to the data set 545 for the time interval 560 since the data set 545 possess the high priority. Hence, the 8000 API requests associated with the API developer 510 are processed until lapse of the time interval 560. Similarly, the priority values for each data set are varied with respect to various time intervals.

Figure 5C:
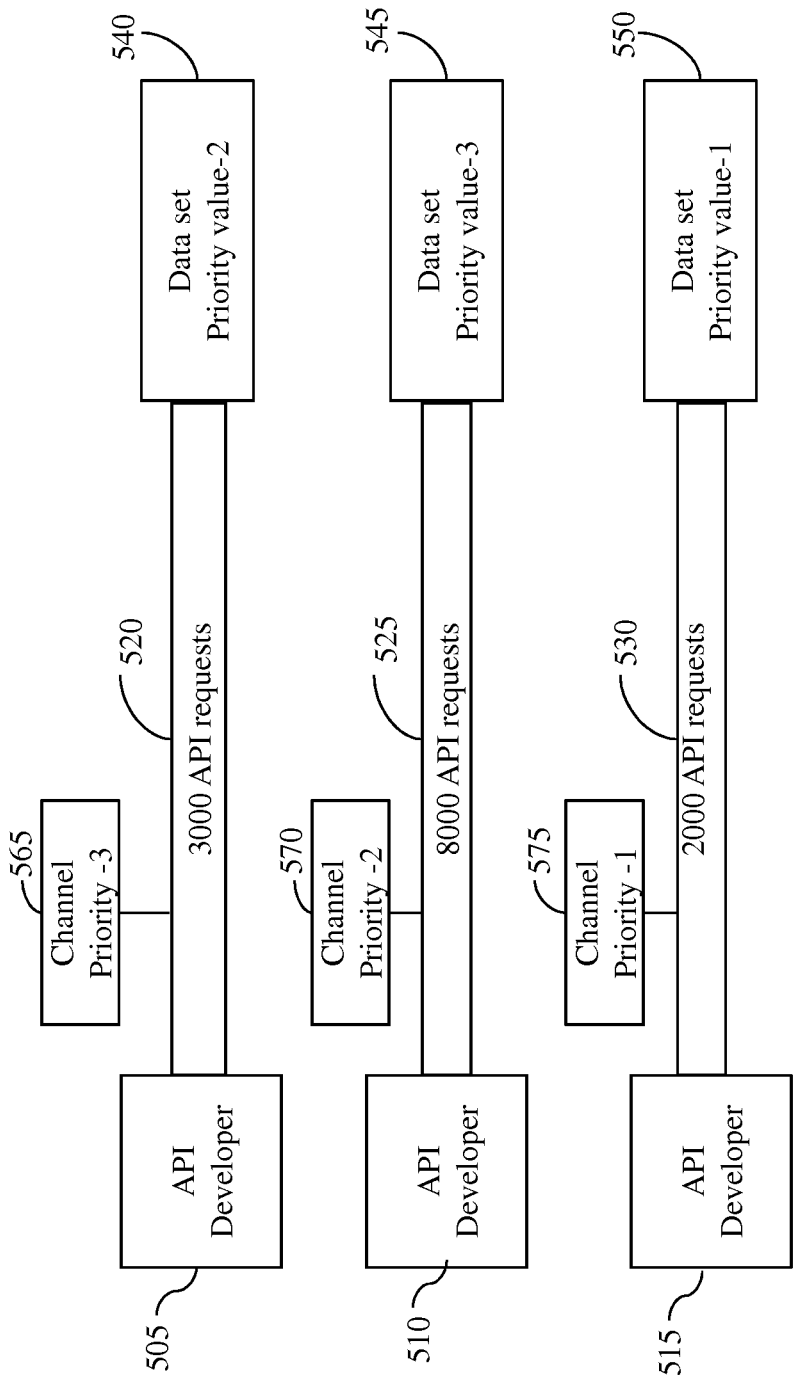

In FIG. 5C, each data channel is associated with a channel priority. For example, the data channel 520 is associated with a channel priority-3 565, the data channel 525 is associated with a channel priority-2 570 and the data channel 530 is associated with a channel priority-1 575. The channel priority, to each data channel, is assigned based on a SLA associated with the API developer 505, the API developer 510 and the API developer 515. The SLA, in one example, can include processing price paid, by each API developer, for processing each API request. The data channel 520 is associated with a channel priority-3 565 as the processing price paid by the API developer 505 is highest when compared to the API developer 510 and the API developer 515. Similarly, the data channel 525 is associated with a channel priority-2 570 as the processing price paid by the API developer 510 is high when compared to the API developer 515.

Further, the data channel 520 includes 3000 API requests accessing the data set 540, the data channel 525 includes 8000 API requests accessing the data set 545, and the data channel 530 includes 2000 API requests accessing the data set 550. The priority values, to each data set is assigned based on a channel priority associated with each data channel and API requests included in each data channel. The priority values are obtained upon calculating product of the channel priority associated with each data channel and API requests included in each data channel.

The product of the channel priority-3 565 associated with the data channel 520 and the 3000 API requests included in the data channel 520 is calculated to be 3*3000=9000. Similarly, the product of the channel priority-2 570 associated with the data channel 525 and the 8000 API requests included in the data channel 525 is calculated to be 2*8000=16000. Likewise, the product of the channel priority-1 575 associated with the data channel 530 and the 2000 API requests included in the data channel 530 is calculated to be 1*2000=2000.

Products of channel priority associated with each data channel and API requests included in each data channel are compared with each other. Hence, the data set 545 is associated with a priority value-3 as the product calculated to be 2*8000=16000 is of greatest value than the product 3*3000=9000 and the product 1*2000=2000. Further, the data set 540 is associated with a priority value-2 as the product calculated to be 3*3000=9000 is of greater value when compared to the product 1*2000=2000. The data set 550 is associated with a priority value-1 as the product calculated to be 1*2000=2000 is of least value. Since, the data set 545 associated with a priority value-3 the data set 545 is considered to possess the high priority.

Further, the cache memory is allocated to the data set 545 such that the 8000 API request included in the data channel 525 can be processed by accessing the data set 545.

Figure 5D:
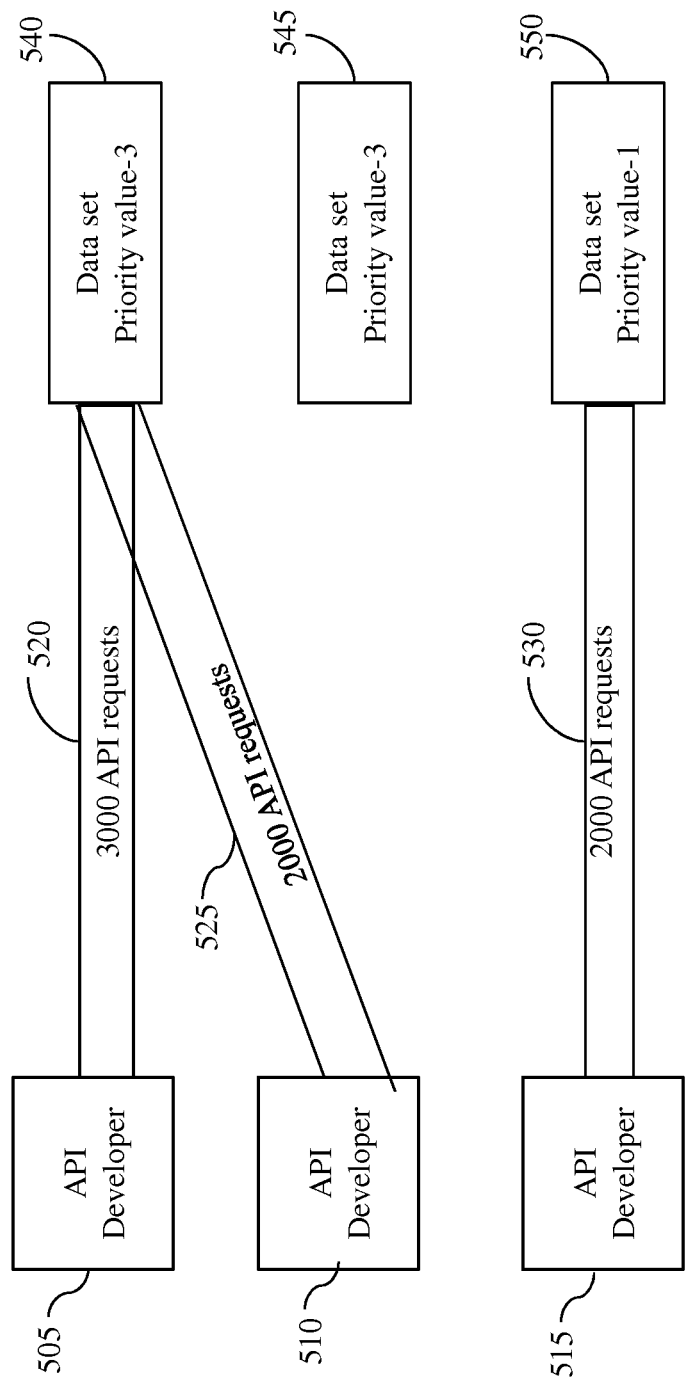

In FIG. 5D, a priority value associated with the data set 540 and the data set 545 are equivalent to each other. Hence, the cache memory is allocated to either the data set 540 or the data set 545 based on the total number of data channels accessing the data set 540 and the data set 545. The cache memory is also allocated based on the API traffic intensity associated with the data set 540 and the data set 545.

Figure 5E:
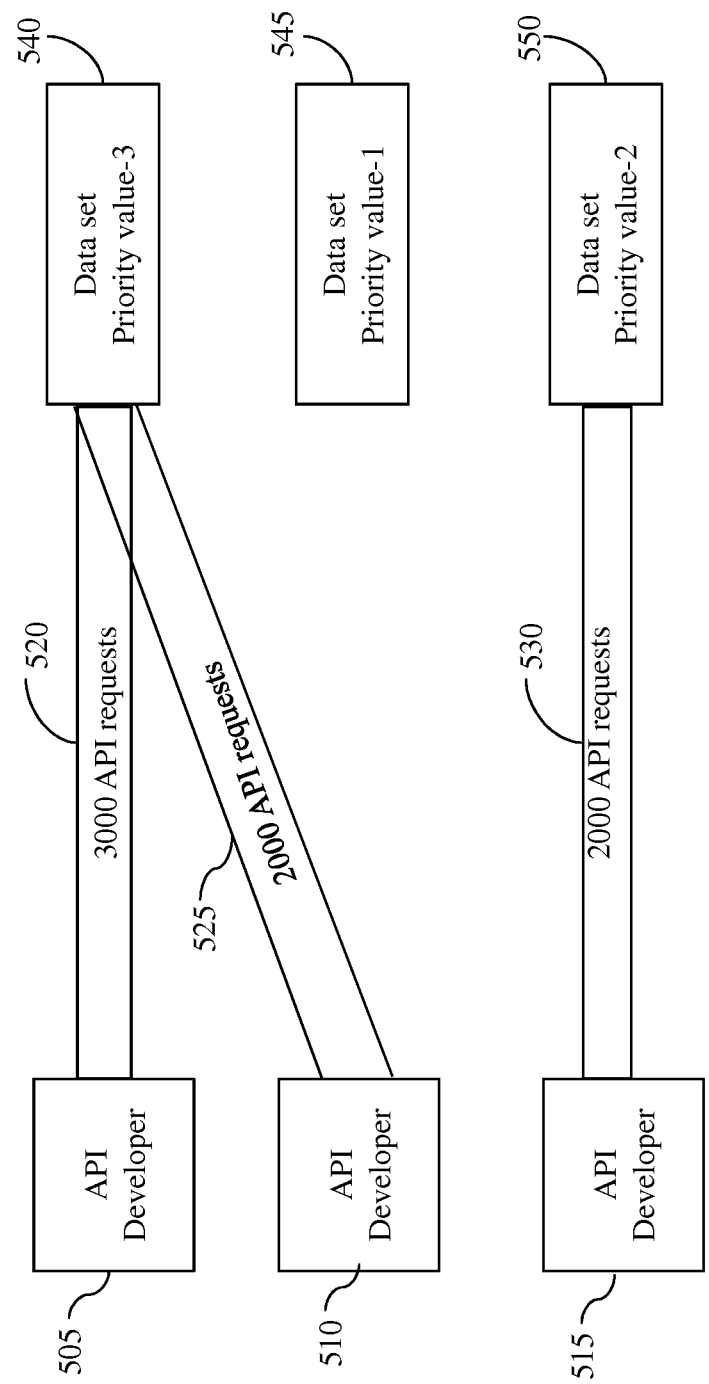

Since the data channel 520 and the data channel 525 are accessing the data set 540, the data set 540 is assigned with the priority value-3 which is of the high priority as shown in FIG. 5E. Further, the API traffic intensity associated with the data set 540 is a sum total of the API requests included in the data channel 520 and the data channel. Hence, the data set 540 is associated with the traffic intensity including 5000 API requests.

Further, the data channel 530 is accessing the data set 550 as illustrated in FIG. 5E. The data set 550 is assigned with the priority value-2 since only a single data channel 530 is accessing the data set 550. Further, since none of the data channels are accessing the data set 545, the data set 545 is assigned the priority value-1 which is of least value.

Further, the cache memory is allocated to the data set 540 such that the 5000 API requests included in a combination of the data channel 520 and the data channel 525 can access the data set 540.

Figure 5F:
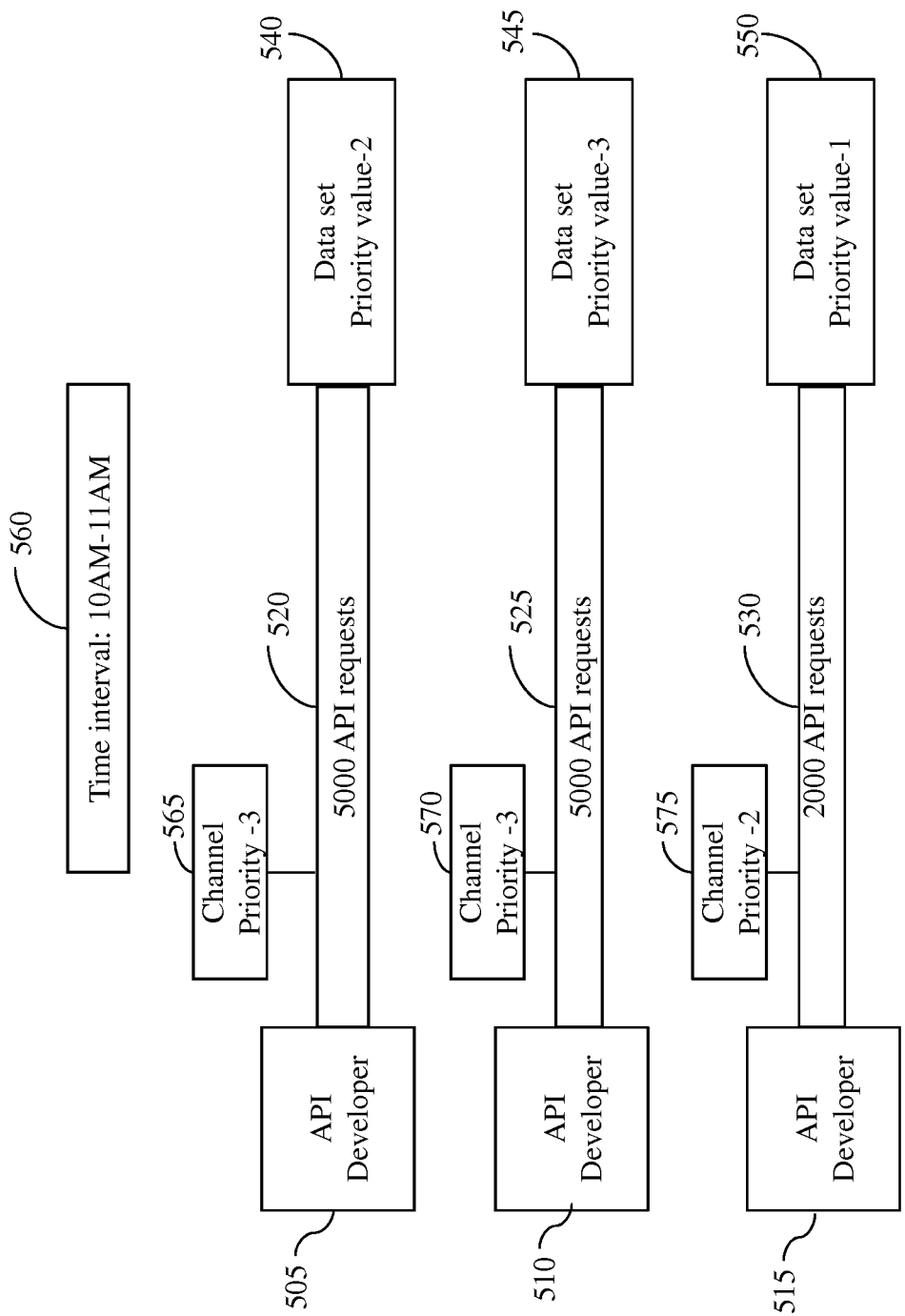

In FIG. 5F, the data channel 520 and the data channel 525 include 5000 API requests each. Further, the data channel 520 and the data channel 525 is associated with the channel priority that are equivalent to each other as shown in FIG. 5F. In such cases, the priority value to the data set is assigned based on a time interval. Since, at the time interval 560 the data set 545 possess the high priority as shown in FIG. 5B, the data set 545 is assigned the priority value-3 as shown in FIG. 5F.

Further, the cache memory is allocated to the data set 545 such that the 5000 API requests included in the data channel 525 can access the data set 545.

Figure 5G:
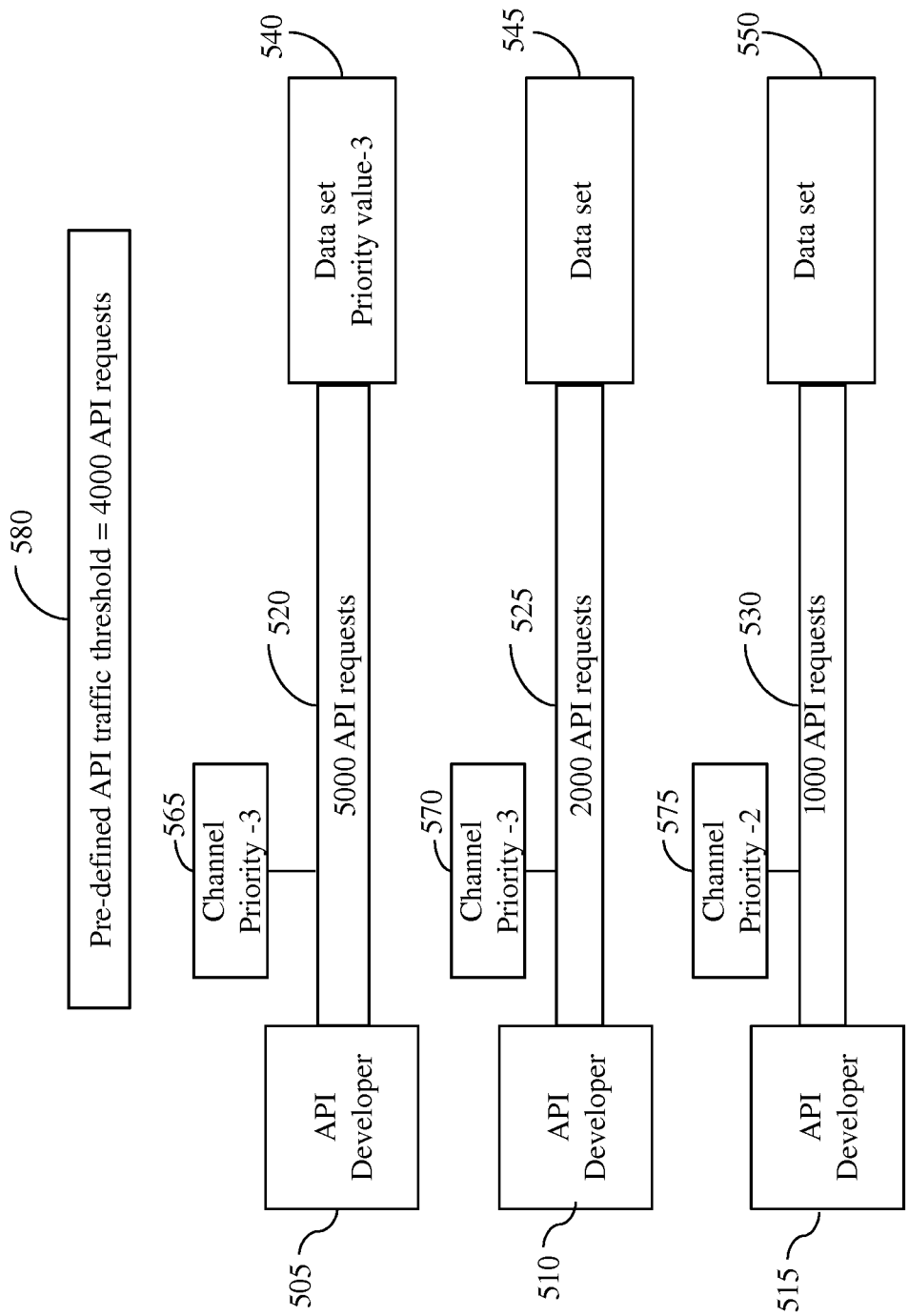

In FIG. 5G each data set is assigned a priority value based on a pre-defined API traffic threshold 580. The pre-defined API traffic threshold 580 is considered to be equivalent to 4000 API requests. Further, the data channel 520 includes 5000 API requests that requires access to data set 540, the data channel 525 includes 2000 API requests that requires access to data set 545 and the data channel 530 includes 1000 API requests that requires access to data set 550.

The data channel 520 including 5000 API requests crosses the pre-defined API traffic threshold 580. Hence, the data set 540 is assigned the priority value-3. Further, the data set 545 and the data set 550 are not assigned the priority values since number of API requests present in the data channel 525 and the data channel 530 are lesser than the pre-defined API traffic threshold 580.

FIGS. 6A-6D is an exemplary illustration of allocating bandwidth based on corresponding precedence value associated with each set of application programming interface (API) requests.

An API environment includes a first API developer 620, a second API developer 625 and a third API developer 630. The first API developer 620 can transmit a first set of API requests. The first set of API requests include a first subset of requests 602 that includes 2500 API requests associated with a corresponding precedence value 3, a second subset of requests 604 that includes 2500 API requests associated with a corresponding precedence value 2, and a third subset of requests 606 that includes 5000 API requests associated with a corresponding precedence value 1.

Similarly, the second API developer 625 can transmit a second set of API requests. The second set of API requests include a first subset of requests 608 that includes 2500 API requests associated with a corresponding precedence value 3, a second subset of requests 610 that includes 2500 API requests associated with a corresponding precedence value 2, and a third subset of requests 612 that includes 5000 API requests associated with a corresponding precedence value 1.

Likewise, the third API developer 630 can transmit a third set of API requests. The third set of API requests include a first subset of requests 614 that includes 2500 API requests associated with a corresponding precedence value 3, a second subset of requests 616 that includes 2500 API requests associated with a corresponding precedence value 2, and a third subset of requests 618 that includes 5000 API requests associated with a corresponding precedence value 1.

The first set of API requests, the second set of API requests and the third set of API requests are received from the first API developer 620, the second API developer 625 and the third API developer 630 respectively. The corresponding precedence value associated with the first subset of requests 602 that is included in the first set of API requests, the first subset of requests 608 that is included in the second set of API requests and the first subset of requests 614 that is included in the third set of API requests are compared with each other. Upon comparing, it is determined that the corresponding precedence value associated with the first subset of requests 602, the first subset of requests 608 and the first subset of requests 614 are equivalent to each other as shown in FIG. 6A.

Further the first subset of requests 602 that is included in the first set of API requests is determined to be associated with high priority. The first subset of requests 602 is determined to be associated with the high priority based on multiple factors, for example, a business associated with the first API developer 620, since the corresponding precedence value associated with the first subset of requests 602, the first subset of requests 608 and the first subset of requests 614 are equivalent to each other.

Figure 6A:
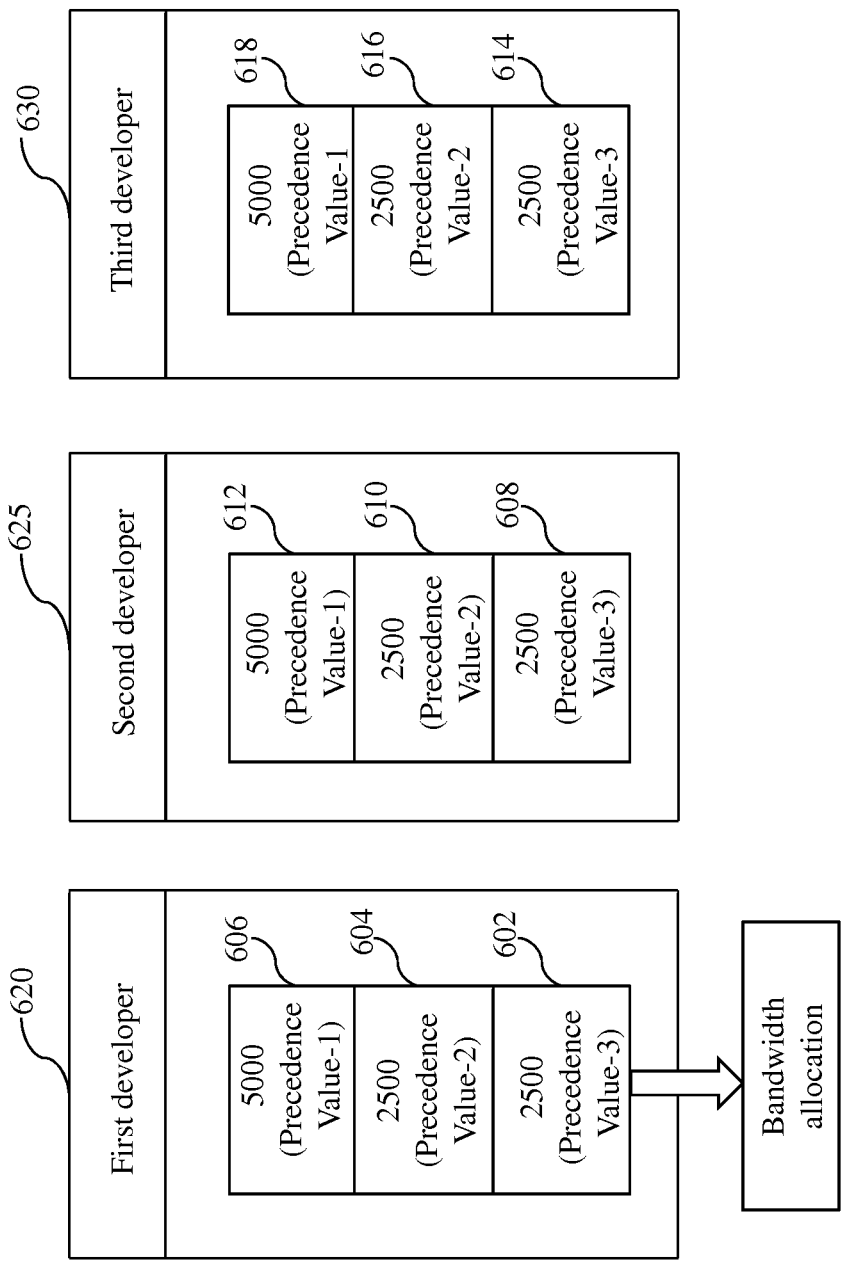
FIGS. 6A-6D is an exemplary illustration of allocating bandwidth based on corresponding precedence value associated with each set of application programming interface (API) requests.

Further, bandwidth is allocated to the first subset of requests 602 that is included in the first set of API requests as shown in FIG. 6A. Upon allocation of the bandwidth, the first subset of requests 602 is processed.

Figure 6B:
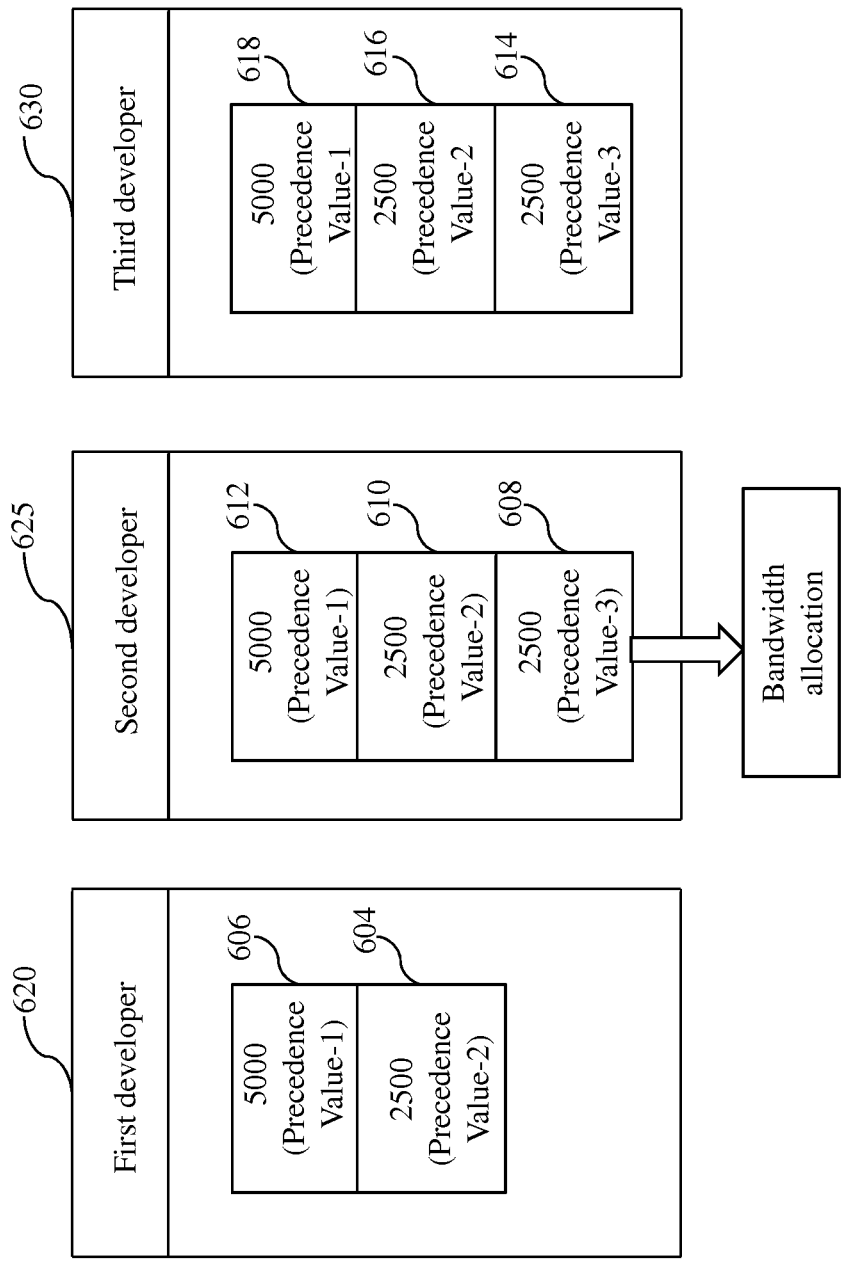

Upon processing the first subset of requests 602, the corresponding precedence value associated with the second subset of requests 604 that is included in the first set of API requests, the first subset of requests 608 that is included in the second set of API requests and the first subset of requests 614 that is included in the third set of API requests are compared with each other as shown in FIG. 6B. Upon comparing, it is determined that the corresponding precedence value associated with the second subset of requests 604 is lesser when compared to the first subset of requests 608 and the first subset of requests 614 as shown in FIG. 6B. Further, it is determined that the corresponding precedence value associated with the first subset of requests 608 that is included in the second set of API requests and the first subset of requests 614 that is included in the third set of API requests are equivalent to each other as shown in FIG. 6B.

Further, the first subset of requests 608 that is included in the second set of API requests is determined to be associated with the high priority. The first subset of requests 608 that is included in the second set of API requests is determined to be associated with the high priority based on the multiple factors, for example, a business associated with the second API developer 625 since, the corresponding precedence value associated with the first subset of requests 608 and the first subset of requests 614 are equivalent to each other.

Further, the bandwidth is allocated to the first subset of requests 608 that is included in the second set of API requests as shown in FIG. 6B. Upon allocation of the bandwidth, the first subset of requests 608 is processed.

Figure 6C:
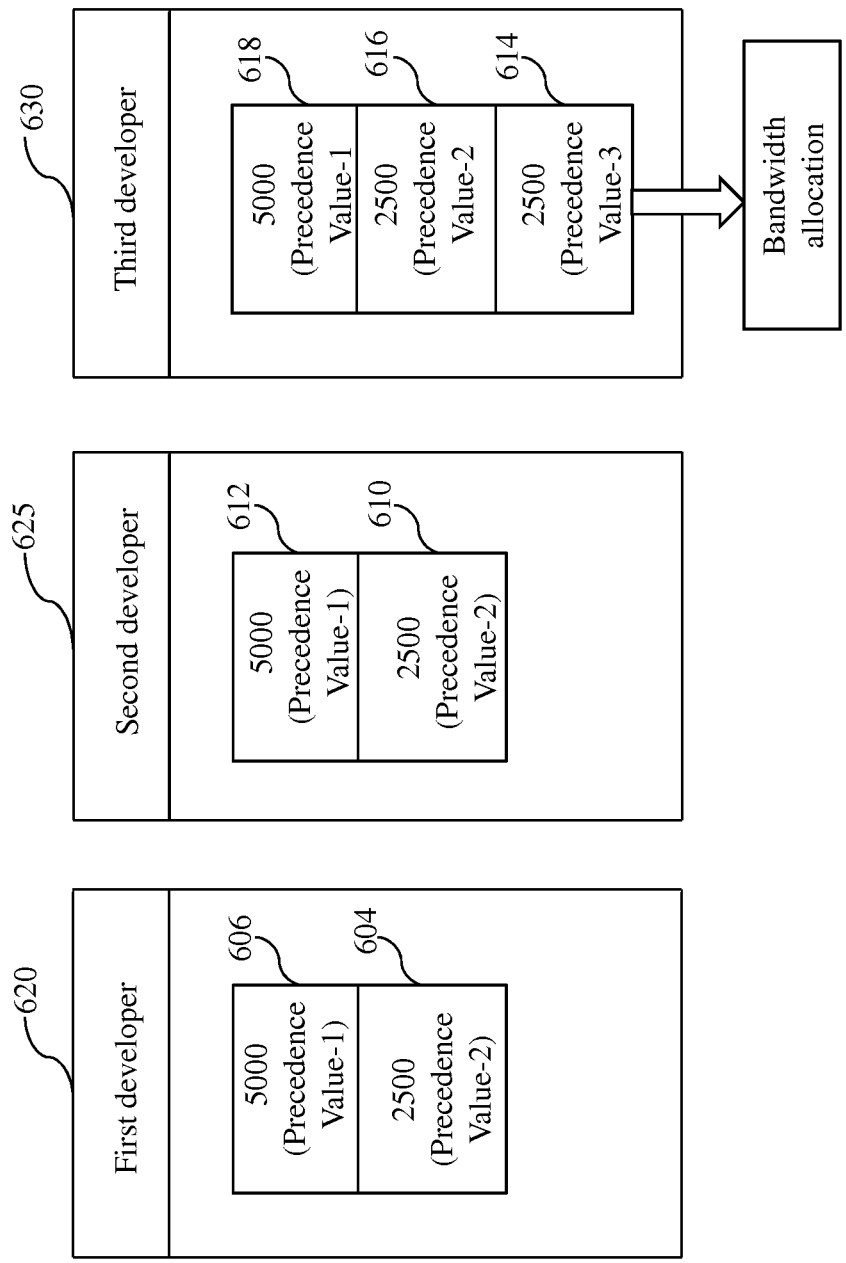

Upon processing the first subset of requests 608 that is included in the second set of API requests, the corresponding precedence value associated with the second subset of requests 604 that is included in the first set of API requests, the second subset of requests 610 that is included in the second set of API requests and the first subset of requests 614 that is included in the third set of API requests are compared with each other as shown in FIG. 4C. Upon comparing, it is determined that the corresponding precedence value associated with the second subset of requests 604 and the second subset of requests 610 is lesser when compared to the first subset of requests 614 as shown in FIG. 6C. Hence, the first subset of requests 614 is determined to be associated with high priority.

Further, the bandwidth is allocated to the first subset of requests 614 that is included in the third set of API requests as shown in FIG. 6C. Upon allocation of the bandwidth, the first subset of requests 614 is processed.

Similarly, the corresponding precedence value associated with the second subset of requests 604 that is included in the first set of API requests, the second subset of requests 610 that is included in the second set of API requests and the second subset of requests 616 that is included in the third set of API requests are compared with each other. Upon comparing, it is determined that the corresponding precedence value associated with the second subset of requests 604, the second subset of requests 610 and the second subset of requests 616 are equivalent to each other as shown in FIG. 6D.

Further, the second subset of requests 604 that is included in the first set of API requests is determined to be associated with the high priority. The second subset of requests 604 that is included in the first set of API requests is determined to be associated with the high priority based on multiple factors, for example, the business associated with the first API developer 620 since the corresponding precedence value associated with the second subset of requests 604 the second subset of requests 610 and the second subset of requests 616 are equivalent to each other.

Figure 6D:
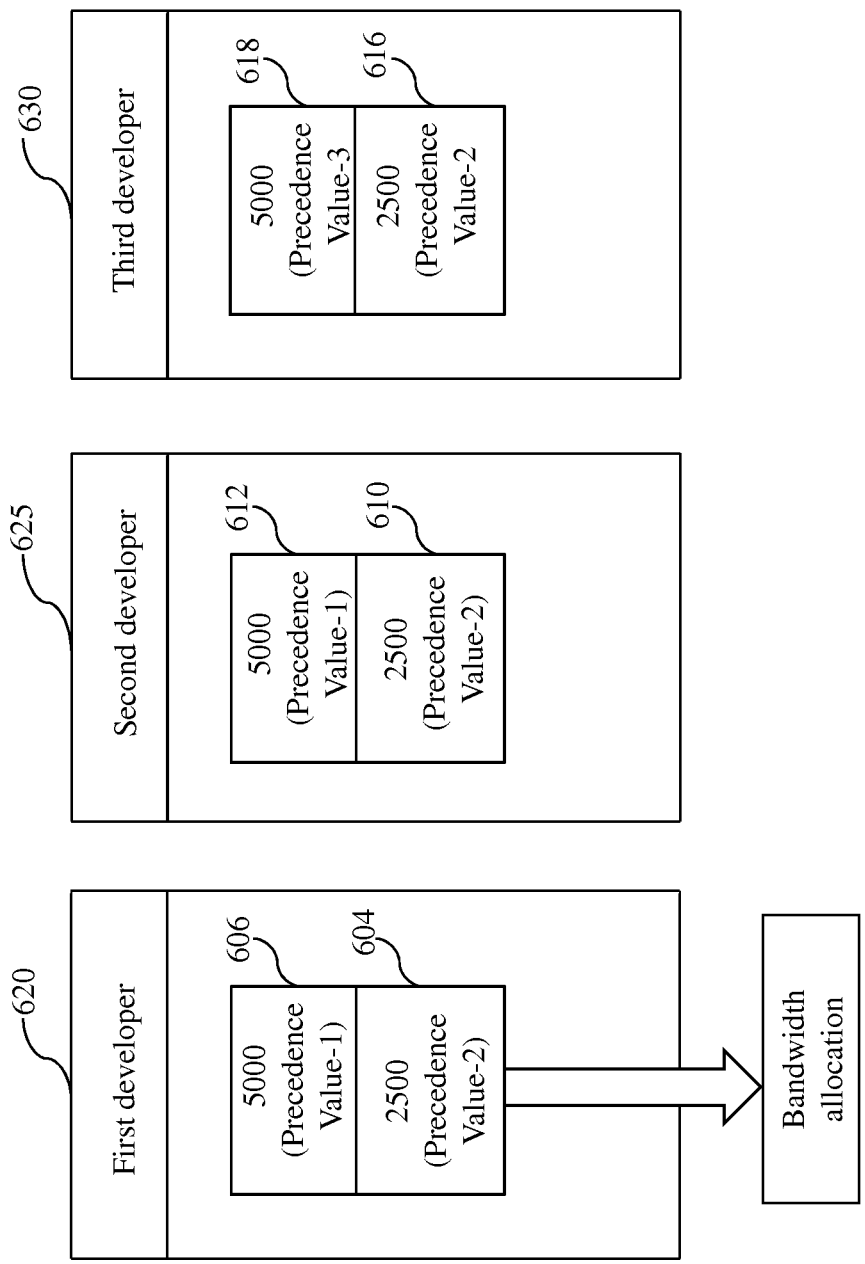

Further, bandwidth is allocated to the second subset of requests 604 that is included in the first set of API requests as shown in FIG. 6D. Upon allocation of the bandwidth, the first subset of requests 604 is processed. Similarly all the subsets included in the first set of the API requests, the second set of the API requests and the third set of the API requests are processed based on the corresponding precedence value.

By allocating the bandwidth to each of the subset of requests based on the corresponding precedence value, equitable distribution of the bandwidth is attained. Hence, bandwidth for processing the API requests transmitted by the first API developer 620, the second API developer 625 and the third API developer 630 are allocated equally thereby avoiding resource starvation.

The method specified in the present disclosure enables allocation of the cache memory, to the API requests, based on time intervals, hence ensuring optimal usage of the cache memory. Also, the method enables achievement of equitable distribution of the bandwidth by determining API requests including precedence value of high priority. Further, the method ensures processing of a set of API requests completely, thereby eliminating unprocessed API requests.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of processing application programming interface traffic, the method comprising:
   determining corresponding application programming interface (API) traffic present in each data channel at a time interval, the corresponding API traffic enabled to access one or more data sets, wherein each data channel of a plurality of data channels is associated to an API developer of a plurality of API developers;
   assigning a corresponding priority value to each of the one or more data sets based on the corresponding API traffic present in each data channel for the time interval, wherein the corresponding priority value is assigned to determine a data set, of the plurality of data sets, that corresponds to a high priority value, wherein a first set of API requests includes a first constant number of said API requests and further wherein predicting a second constant number of the API requests is based on a total number of the processed API requests; and allocating a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

2. The method as claimed in claim 1, wherein the corresponding API traffic is determined using one or more prediction algorithms.

3. The method as claimed in claim 1, wherein the corresponding priority value assigned to each of the plurality of data sets varies in accordance with the time interval.

4. The method as claimed in claim 1, wherein the corresponding priority value assigned to each of the plurality of data sets is based on a channel priority associated with each data channel and the corresponding API traffic associated with each data channel and further wherein a processor determines the plurality of data sets of the high priority value for the time interval when the corresponding API traffic of large intensity is accessing the data set at the time interval.

5. The method as claimed in claim 4, wherein the channel priority is assigned based on a service level agreement associated with each of the plurality of API developers.

6. The method as claimed in claim 1, wherein the corresponding priority value assigned to the data set is based on at least one of a total number of data channels accessing the data set and API traffic intensity associated with the data set.

7. The method as claimed in claim 1, wherein the corresponding priority value assigned to a data set is based on the time interval, if the plurality of data channels comprise at least one of a channel priority and an API traffic intensity that are equivalent to each other.

8. The method as claimed in claim 1, wherein the corresponding priority value assigned to a data set is based on a pre-defined API traffic threshold associated with each data channel.

9. A method of processing application programming interface traffic the method comprising:

receiving a plurality of sets of application programming interface (API) requests from a plurality of API developers, each of the plurality of sets of API requests being associated with a corresponding precedence value that is based on a plurality of factors;

comparing corresponding precedence values, associated with the plurality of sets of API requests, with each other to determine the corresponding precedence value of high priority;

determining a set of API requests, from the plurality of sets of API requests based on the corresponding precedence value of a high priority, wherein a first set of API requests includes a first constant number of said API requests and further wherein predicting a second constant number of the API requests is based on a total number of the processed API requests; and allocating bandwidth to the set of API requests to enable processing of the set of API requests and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

10. The method as claimed in claim 9, wherein the plurality of factors comprises at least one of a business associated with each of the plurality of API developers and a processing capacity of a message processing unit that processes the plurality of sets of API requests.

11. A method of processing application programming interface traffic, the method comprising:

receiving a first set of application programming interface (API) requests by a message processing unit, the first set of API requests comprising a first constant number of the API requests;

determining a total number of processed API requests comprised in the first set of API requests;

predicting a second constant number of API requests based on the total number of processed API requests, wherein the second constant number is comprised in a second set of API requests; and allocating a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

12. The method as claimed in claim 11, wherein predicting comprises at least one of
increasing the first constant number of the API requests; and
decreasing the first constant number of the API requests.

13. The method as claimed in claim 11 is iteratively performed at regular time intervals.

14. A computer program product stored on a non-transitory computer-readable medium that when executed by a processor, performs a method of processing application programming interface traffic, the method comprising:

determining corresponding application programming interface (API) traffic present in each data channel at a time interval, the corresponding API traffic enabled to access one or more data sets, wherein each data channel of a plurality of data channel is associated to an API developer of the plurality of API developers, wherein a first set of API requests includes a first constant number of said API requests and further wherein predicting a second constant number of the API requests is based on a total number of the processed API requests;

assigning a corresponding priority value to each of the one or more data sets based on the corresponding API traffic present in each data channel for the time interval, wherein the corresponding priority value is assigned to determine a data set, of the plurality of data sets, that corresponds to a high priority value; and allocating a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

15. The computer program product as claimed in claim 14, wherein the corresponding API traffic is determined using one or more prediction algorithms.

16. The computer program product as claimed in claim 14, wherein the corresponding priority value assigned to each of the plurality of data sets varies in accordance with the time interval.

17. The computer program product as claimed in claim 14, wherein the corresponding priority value assigned to each of the plurality of data sets is based on a channel priority associated with each data channel and the corresponding API traffic associated with each data channel and further wherein a processor determines the plurality of data sets of the high priority value for the time interval when the corresponding API traffic of large intensity is accessing the data set at the time interval.

18. The computer program product as claimed in claim 14, wherein the channel priority is assigned based on a service level agreement associated with each of the plurality of API developers.

19. The computer program product as claimed in claim 14, wherein the corresponding priority value assigned to the data set is based on at least one of a total number of data channels accessing the data set and an API traffic intensity associated with the data set.

20. The computer program product as claimed in claim 14, wherein the corresponding priority value assigned to a data set is based on the time interval, if the plurality of data channels comprise at least one of a channel priority and an API traffic intensity that are equivalent to each other.

21. The computer program product as claimed in claim 14, wherein the corresponding priority value assigned to a data set is based on a pre-defined API traffic threshold associated with each data channel.

22. A computer program product stored on a non-transitory computer-readable medium that when executed by a processor, performs a method of processing application programming interface traffic, the method comprising:

receiving a plurality of sets of application programming interface (API) requests from a plurality of API developers, each of the plurality of sets of API requests being associated with a corresponding precedence value that is based on a plurality of factors;

comparing corresponding precedence values, associated with the plurality of sets of API requests, with each other to determine the corresponding precedence value of high priority;

determining a set of API requests, from the plurality of sets of API requests based on the corresponding precedence value of a high priority, wherein a first set of API requests includes a first constant number of said API requests and further wherein predicting a second constant number of the API requests is based on a total number of the processed API requests; and allocating bandwidth to the set of API requests to enable processing of the set of API requests and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

23. The computer program product as claimed in claim 22, wherein the plurality of factors comprises at least one of a business associated with each of the plurality of API developers and a processing capacity of a message processing unit that processes the plurality of sets of API requests.

24. A computer program product stored on a non-transitory computer-readable medium that when executed by a processor, performs a method of processing application programming interface traffic, the method comprising:

receiving a first set of application programming interface (API) requests by a message processing unit, the first set of API requests comprising a first constant number of the API requests;

determining a total number of processed API requests comprised in the first set of API requests;

predicting a second constant number of API requests based on the total number of processed API requests, wherein the second constant number is comprised in a second set of API requests; and allocating a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

25. The computer program product as claimed in claim 24, wherein the predicting comprises at least one of
increasing the first constant number of the API requests; and
decreasing the first constant number of the API requests.

26. The computer program product as claimed in claim 24 is iteratively performed at regular time intervals.

27. A system for processing application programming interface traffic the system comprising:
- an electronic device;
- a communication interface in electronic communication with the electronic device;
- a memory that stores instructions; and
- a processor responsive to the instructions to
- determine corresponding application programming interface (API) traffic present in each data channel at a time interval, the corresponding API traffic enabled to access one or more data sets, wherein each data channel of a plurality of data channel is associated to an API developer of the plurality of API developers;
- assign a corresponding priority value to each of the one or more data sets based on the corresponding API traffic present in each data channel for the time interval, wherein the corresponding priority value is assigned to determine a data set, of the plurality of data sets, that corresponds to a high priority value, wherein a first set of API requests includes a first constant number of said API requests and further wherein predicting a second constant number of the API requests is based on a total number of the processed API requests; and
- allocate a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

28. A system for processing application programming interface traffic the system comprising:
- an electronic device;
- a communication interface in electronic communication with the electronic device;
- a memory that stores instructions; and
- a processor responsive to the instructions to:
- receive a plurality of sets of application programming interface (API) requests from a plurality of API developers, each of the plurality of sets of API requests being associated with a corresponding precedence value that is based on a plurality of factors;
- compare corresponding precedence values, associated with the plurality of sets of API requests, with each other to determine the corresponding precedence value of high priority;
- determine a set of API requests, from the plurality of sets of API requests based on the corresponding precedence value of a high priority, wherein a first set of API requests includes a first constant number of said API requests and further wherein predicting a second constant number of the API requests is based on a total number of the processed API requests; and
- allocate bandwidth to the set of API requests to enable processing of the set of API requests and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

29. A system for processing application programming interface traffic the system comprising:
- an electronic device;
- a communication interface in electronic communication with the electronic device;
- a memory that stores instructions; and
- a processor responsive to the instructions to:
- receive a first set of application programming interface (API) requests by a message processing unit, the first set of API requests comprising a first constant number of the API requests;
- determine a total number of processed API requests comprised in the first set of API requests;
- predict a second constant number of API requests based on the total number of processed API requests, wherein the second constant number is comprised in a second set of API requests; and
- allocating a cache memory to store the data set that corresponds to the high priority value and further allocating bandwidth to a first subset of requests that is included in a first set of API requests, wherein the first subset of requests is determined to be associated with a high priority based on a plurality of factors, the allocating bandwidth including comparing the priority of the first subset of requests with the priority of a second subset of requests as processing prices paid, and the allocating bandwidth to the first subset of requests being conditional on determining from the comparison that the priority of the first subset of requests is high relative to the priorities of other subsets of requests, thereby attaining equitable distribution of the bandwidth and avoiding resource starvation.

* * * * *

UNITED STATES PATENT AND TRADEMARK OFFICE
CERTIFICATE OF CORRECTION

PATENT NO.       : 9,665,410 B2                                    Page 1 of 1
APPLICATION NO. : 13/794839
DATED            : May 30, 2017
INVENTOR(S)      : Naveenkumar Muguda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 135 days.

Signed and Sealed this
Twenty-fifth Day of September, 2018

Andrei Iancu
*Director of the United States Patent and Trademark Office*